(12) United States Patent
Nakagiri et al.

(10) Patent No.: US 6,558,841 B1
(45) Date of Patent: May 6, 2003

(54) NEGATIVE ELECTRODE FOR NON-AQUEOUS ELECTROLYTE RECHARGEABLE BATTERIES

(75) Inventors: Yasushi Nakagiri, Kyotanabe (JP);
Toshitada Sato, Kadoma (JP);
Hideharu Takezawa, Katano (JP);
Hiromu Matsuda, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 129 days.

(21) Appl. No.: 09/649,581

(22) Filed: Aug. 29, 2000

(30) Foreign Application Priority Data

Aug. 30, 1999 (JP) .......................................... 11-244060

(51) Int. Cl.[7] ............................................... H01M 4/36
(52) U.S. Cl. .................................................. 429/218.1
(58) Field of Search ........................... 429/218.2, 218.1

(56) References Cited

U.S. PATENT DOCUMENTS 5,474,862 A * 12/1995 Okuno ........................ 429/197
5,770,333 A * 6/1998 Saito ........................... 429/194
5,998,064 A * 12/1999 Amine ....................... 429/218.1
6,007,945 A * 12/1999 Jacobs ....................... 429/218.1

FOREIGN PATENT DOCUMENTS

| JP | 9-63651 | 3/1997 | |
| JP | 10316423 | * 12/1998 | ........... C01G/19/00 |
| JP | 11-86853 | 3/1999 | |
| JP | 11-135120 | 5/1999 | |

* cited by examiner

Primary Examiner—Patrick Ryan
Assistant Examiner—Mark Ruthkosky
(74) Attorney, Agent, or Firm—McDermott, Will & Emery (57) ABSTRACT

The purpose of the present invention is to provide a negative electrode for non-aqueous electrolyte rechargeable batteries of which the capacity is high and of which the decrease of the discharging capacity through the cycles is low by improving the electron conductivity of the surfaces of the active material particle for the negative electrode. In order to achieve this purpose, an active material in the form of a composite particle comprising, a phase that can store a lithium ion and includes at least Sn and a phase that cannot store a lithium ion and an electronically conductive material coating part of or the entire surfaces of the above described particle, is used for the negative electrode in the present invention.

3 Claims, 2 Drawing Sheets

NEGATIVE ELECTRODE FOR NON-AQUEOUS ELECTROLYTE RECHARGEABLE BATTERIES

BACKGROUND OF THE INVENTION

The present invention relates to a negative electrode for non-aqueous electrolyte rechargeable (secondary) batteries, and a production method for the same, of which the capacity is high and of which the discharge capacity has been improved so as not to deteriorate through the cycle usage.

In recent years, the demand for lithium ion rechargeable batteries, which have high electromotive force and high energy density, has greatly expanded along with the development of mobile communication equipment and portable electronic appliances. Lithium metal can be used for the negative electrode.material of this type of lithium rechargeable batteries in order to gain high energy density. However, dendrite deposits on the negative electrode at the time of charging, and when the charging and discharging are repeated the dendrite grows to stick out of the separator to reach the positive electrode side, which may cause the problem of internal short circuit.

Moreover, the deposited dendrite occupies a relatively large surface area, which enhances the reaction activation, and reacts with the solvent in the electrolyte on the surface so as to form an interface film like solid electrolyte, which lacks the electron conductivity. Thereby the internal resistance of the battery becomes high or a particle isolated from the network of the electron conductance are generated, which becomes the factor of lowering the charging and discharging efficiency, that is the cycle characteristics. In this way, the lithium rechargeable batteries where lithium metal is used as the negative electrode material have problems with the safety and the cycle characteristics.

At present, a battery has been put in practical use by utilizing a carbonaceous material, which can store and desorb a lithium ion as the negative electrode material alternating the lithium metal. Since no metal lithium deposits on the negative electrode made of carbonaceous material, usually there is no problem of the internal short circuit due to dendrite. In the case that graphite is used as the carbonaceous material, however, the theoretical capacity is 372 mAh/g, which is only one tenth of the theoretical capacity of lithium as a simple metal, and therefore, a capacity of a satisfactory level can not be obtained.

As a negative electrode active material, which can make the capacity higher, Sn of a simple metal is known which forms a compound with lithium. The compound of Sn which includes the largest amount of lithium is represented by the formula $Li_{22}Sn_5$, and in the case this compound is used, typically no metal lithium deposits and there is no problem of the internal short circuit due to dendrite. And the electrochemical capacity between this compound and Sn as a simple substance is 993 mAh/g, which is larger than the theoretical capacity of graphite.

In addition, a negative electrode material which comprises an intermetallic compound including at least one of the group 4B elements, P and Sb and having a crystal structure of $CaF_2$ type, ZnS type or AlLiSi type has been proposed (the Japanese unexamined patent publication Hei-9(1997)-63651) as a compound negative electrode material of which the capacity is higher than that of the carbonaceous material. And a composite particle, which comprises an active material as a simple substance or a compound capable of the intercalation and the desorption of the lithium ion and carbonaceous material has been proposed as the negative electrode material (the Japanese unexamined patent publication Hei-11(1999)-135120).

However, there is a problem with Sn, which forms a compound with lithium and has a higher capacity than that of the above described carbonaceous material, in that Sn is inferior to the carbonaceous negative electrode material in the charging and discharging cycle characteristics. That is to say, because of the expansion caused by the formation of a compound with an stored lithium due to the charging reaction and contraction caused by a lithium desorption due to the discharging reaction, the active material particle becomes minute or fine. In other words, two phases with a volume difference are repeatedly converted to each other through the charging and discharging reaction, which causes the distortion of the material and generates a crack so as to make the active material particle further minute. Between the minute active material particles the electron conductivity is lost which leads to electrochemical inactivity, and the charging and discharging capacity is lowered.

On the other hand, a negative electrode material, which comprises an intermetallic compound containing at least one of the group 4B elements, P and Sb and has the crystal structure of $CaF_2$ type, ZnS type or AlLiSi type, has been proposed as a negative electrode material having an improved cycle life characteristics e been improved instead of the above described simple substance such as Sn (the Japanese unexamined patent publication Hei-9(1997)-63651). This material is supposed to have better charging and discharging cycle characteristics than that of the Li—Pb alloy negative electrode material and have a higher capacity than that of the graphite negative electrode material. However, the discharging capacity in the charging and discharging cycles, up to 10 to 20 cycles, decreases remarkably and even the capacity of $Mg_2Sn$, which seems to have the best characteristics, decreases to approximately 70% of the initial capacity after about 20 cycles. It seems that this is because even the active material particle in those materials expand or contract slightly, which makes it difficult to maintain the contact condition with the conductive agent after the charging and discharging, therefore, the contact degree between the active material particle and the conductive agent is deteriorated.

Moreover, a composite particle, which comprises an active material formed of a simple substance or a compound capable of the intercalation and desorption of the lithium ion and a carbonaceous material, has been proposed as a negative electrode material (the Japanese unexamined patent publication Hei-11(1999)-135120). The composite particle of this active material and the carbonaceous material is obtained by coating the active material comprising a simple substance or a compound capable of the intercalation and desorption of the lithium ion with the carbonaceous material. However, either the simple substance or the compound forming the internal active material stores or desorbs the lithium ion not like the carbonaceous material, which coats the surface of the active material, and therefore, the particle itself expands and contracts as described above.

In addition, it is difficult to coat only the surface of the active material including a Sn atom with the carbonaceous material and it is also considered difficult to prevent the active material from becoming deteriorated due to the expansion and the contraction.

It is an object of the present invention to provide a negative electrode material for non-aqueous electrolyte rechargeable batteries, which uses an active material particle including the element Sn of high capacity, and which maintains the contacts between the active material particle and the conductive agent without breaking into minute particle even after the expansion and the contraction are repeated along with the absorption and desorption of lithium in an electrochemical manner so as to improve the charging and discharging cycle life characteristics.

SUMMARY OF THE INVENTION

In order to solve the above described problems, the present invention provides a negative electrode for non-aqueous electrolyte rechargeable batteries comprising; an active material composed of a lithium ion storing phase, which contains at least Sn and a lithium ion non-storing phase, and an electronically conductive material, which coats at least a part of the surface of said active material. In other words, the present invention provides a negative electrode for non-aqueous electrolyte rechargeable batteries comprising an active material in the form of a composite particle of; an active material particle having a lithium ion storing phase, which contains at least Sn as the component and a lithium ion non-storing phase; and an electronically conductive material which coats at least a part of the surface of said active material particle.

In the negative electrode for non-aqueous electrolyte rechargeable batteries, it is preferable that the lithium ion storing phase further contains, as another component, at least one type of element selected from the group consisting of the group 2 elements, the transitional elements, the group 12 elements, the group 13 elements and the group 14 elements in the periodic table, and the another component and Sn form a solid solution or an intermetallic compound.

Further, it is preferable that the electronically conductive material coats 10% or more of the entire surface of said active material.

Further, it is preferable that the electronically conductive material is at least one selected from the group consisting of an electronically conductive polymer, a carbonaceous material and a metallic material.

Further, it is preferable that the carbonaceous material includes a fibrous carbon.

Further, it is preferable that the fibrous carbon is in a fiber shape having a lattice spacing $d_{002}$ of (002) plane of 3.35 to 3.70 Å, a length of 1 to 20 $\mu$m and a diameter of 0.1 to 0.5 $\mu$m, and the fibrous carbon in the carbonaceous material is in a range of 1 to 20 wt % of the active material and the electronically conductive material.

Further, the present invention provides a production method of an active material for a negative electrode for non-aqueous electrolyte rechargeable batteries, said active material being composed of a lithium ion storing phase, which contains at least Sn, and a lithium ion non-storing phase; and an electronically conductive material, which coats at least a part of the surface of said active material. In other words, the present invention provides a production method of a composite particle for a negative electrode for non-aqueous electrolyte rechargeable batteries, said composite particle comprising an active material particle having a lithium ion storing phase, which contains at least Sn as the component, and a lithium ion non-storing phase; and an electronically conductive material, which coats at least a part of the surface of said active material particle.

The production method comprises the steps immersing a negative electrode active material particle into an organic solvent containing a conductive polymer material dissolved, and drying said active material particle to coat at least a part of the surface of said active material particle with said conductive polymer material to give said active material.

Another production method of the present invention comprises the step of applying a mechanical energy comprising a compressive force and a grinding force to a mixture of a negative electrode active material particle and an electronically conductive material to coat at least a part of the surface of said active material particle with said electronically conductive material through a mechanochemical reaction to give said active material.

Further, the present invention provides a non-aqueous electrolyte rechargeable battery, comprising a positive electrode capable of a reversible electrochemical reaction of a lithium ion, a non-aqueous, electrolyte comprising a lithium salt dissolved in an organic solvent and the above-mentioned negative electrode.

In particular, the above described active material, i.e. composite particle, which functions as a so-called negative electrode material, comprises a core active material particle and a shell electronically conductive material coating, in which the active material particle enhances the capacity and the conductive material maintains the contact with the active material particle even when the active particle repeats the expansion and contraction along with the storing (absorbing) and disorption of lithium ion in an electrochemical manner and, therefore, the cycle characteristics can be maintained and improved.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The negative electrode material for non-aqueous electrolyte rechargeable batteries in accordance with the present invention is, as described above, a composite particle formed of an active material particle having a lithium ion storing phase (phase which stores lithium ion) and non lithium ion storing phase (phase which does not store lithium ion) and an electronically conductive material, which coats at least a part of a surface, i.e. a part of or the entire surface, of the active material particle since the lithium ion storing phase and the lithium ion non-storing phase coexist in the active material particle, the expansion and the contraction can be relieved or suppressed in the entire active material. In other words, the expansion and the contraction are absorbed. Furthermore, these two phases do not only contact each other but the conductive material coating the surface of the active material particle can further relieve the expansion and the contraction and can also maintain the electron conductivity network between the active material particles.

The production method fore the negative electrode for non-aqueous electrolyte rechargeable batteries in accordance with the present invention has the step of immersing a negative electrode active material particle into an organic solvent containing a dissolved conductive Polymer material and, then, drying the active material particle to coat at least a part of or the entire surface of the active material particle.

And another production method for a negative electrode for non-aqueous electrolyte rechargeable batteries in accordance with the present invention has the steps of applying mechanical energy comprising compressive force and grinding force to a mixture of a negative electrode active material particle and an electronically conductive material to coat at least a part of the surface of the active material particle with the conductive material through a mechanochemical reaction.

The non-aqueous electrolyte rechargeable battery in accordance with the present invention is provided with a positive electrode capable of a reversible electrochemical reaction of a lithium ion, a non-aqueous electrolyte comprising a lithium salt dissolved in an organic solvent and the above described negative electrode.

The lithium ion storing phase in the active material particle used in the present invention contains at least one more type of element in addition to Sn as the component, element, which is selected from the group consisting of the group 2 elements, the transitional elements, the group 12 elements, the group 13 elements and the group 14 elements in the periodic table. And the selected element and Sn form a solid solution or an intermetallic compound. The lithium ion non-storing phase may be any of a simple substance, a solid solution or an intermetallic compound, which do not store lithium. The mean particle size (diameter) of the active material particle having those two or more phases is preferably 0.01 to 50 $\mu$m.

The conductive material used in the present invention should of course have a high electric conductivity and it is important to have the functions to absorb the expansion of the active material particle and to maintain the contact between the active material particles even when the active material particles contract. In particular, a conductive polymer, a carbonaceous material and a metal material are suitable for this usage. For example, as the conductive polymer material, materials such as polyaniline, polypyrrole, polythiophene, polyphenylene derivative and the like can be used. And, as the carbonaceous material, graphite type carbons in a graphite group such as a natural graphite (scaly graphite and the like), an artificial graphite and an expanded graphite, amorphous carbons in a carbon black group such as acetylene black, ketjen biack, channel black, furnace black, lamp black and thermal black are exemplified. Among them, particularly, scaly natural graphite or artificial graphite, expanded graphite, acetylene black and ketjen black are preferable. The graphite type carbon having a lattice spacing $d_{002}$ of (002) plane (interlayer distance $d_{002}$) of 0.335 to 0.339 nm, which is calculated by means of a wide angle X-ray diffraction, is preferable for the excellent electron conductivity. The preferable median diameter of the graphite type carbon particle to be used is 30 $\mu$m or less and more preferably 20 $\mu$m or less. And it is also preferable to use a fibrous carbon together as described in the followings.

As the metallic material, nickel, cobalt, copper, manganese, iron, platinum, gold, silver, palladium and the like can be exemplified. Among them, particularly nickel, cobalt and copper are preferable. The median diameter of the metallic material particle is preferably 20 $\mu$m or less and more preferably 10 $\mu$m or less. In addition, super fine particle having a median diameter of 1 $\mu$m or less may be used.

The carbonaceous material including the fibrous carbon can be used as the above described carbonaceous material in order to obtain a larger effect. As for the fibrous carbon, a polyacrylonitrile-type carbon fiber, a pitch-type carbon fiber, a vapor phase growth carbon fiber and the like can be exemplified and any of which may be used. The vapor phase epitaxy carbon fiber has a higher property as graphite and an excellent electron conductivity compared to the polyacrylonitrile-type carbon fiber and the pitch-type carbon fiber, and therefore, the vapor phase epitaxy carbon fiber is particularly preferable. The vapor phase epitaxy carbon fiber is obtained by manufacturing a carbon fiber through the thermal decomposition of a gaseous hydrocarbon at a high temperature and by heating it at a temperature of 1,000° C. or more.

Those conductive materials may be used alone or in combination of two or more.

The ratio of the coated surface area of the active material particle with the conductive material to the entire surface area of the active material particle in accordance with the present invention is preferably 10% or more. This is because the effect of the coating with the conductive material can be greatly obtained by coating 10% or more of the entire surface. The thickness of the coating of the conductive.material is preferably 0.01 to 10 $\mu$m. This is because, in the case of the thickness thinner than 0.01 $\mu$m, the electron conductivity is lowered. In the case of the thickness thicker than 10 $\mu$m, the lithium ion diffusion into the active material is decreased. In addition, the amount of the conductive material in the present invention is preferably in the range of 5 to 80 wt % of the composite particle in the negative electrode material. In the case of less than 5 wt %, the ratio of the volume of the conductive material to the volume of the active material particle is too small to give enough electron conductivity among the active material particles, and therefore, the internal resistance of the battery becomes too high or a particle isolated from the network of the electron conductivity appears to exist. In the case of more than 80 wt %, the charging and discharging capacity per volume is too small.

Here, the fibrous carbon included in the carbonaceous material is explained. Since the fibrous carbon is in a form of a flexible fine thread, the number of contact points with the active material particles can be increased compared to the conventional acetylene black or artificial graphite. In particular, in the case that the active material particle is in a form close to a sphere and the carbonaceous material is, for example, in a scaly form as a conventional conductive agent, the contact between the active material particle and the carbonaceous material is merely a point contact. It is possible, however, for the fibrous carbon to be able to have more contact points between the active material particle and the conductive agent through a line contact of fiber closely surrounding the sphere. This can be confirmed through the observation using a scanning electron microscope (SEM) or the like. And the fibrous carbon has a larger recovering storing force for a macro displacement compared to the acetylene black and the artificial graphite. In a powder pressurizing container with a constant diameter, the recovery amount was measured when the pressure was released after applying a certain pressure (1,000 kg/cm$^2$), it was confirmed that the fibrous carbon had a recovery ratio approximately 2 to 40 times as high as the acetylene black or the scaly artificial graphite as shown in Table 1.

TABLE 1

| Conductive Agent | Vapor phase epitaxy carbon fiber | Acetylen Black | Scaly artificial graphite |
|---|---|---|---|
| Recovery ratio* | 60~80% | 20~30% | 2~5% |

*Recovery ratio = (height of a powder after compressed/height of a powder before compressed) × 100(%)

If the active material particle containing Sn is coated with the fibrous carbon, contact points between the active material particle and the fibrous carbon can be increased as described above with large recovering force for macro displacement and, therefore, when the active material particle containing Sn contracts while desorbing (releasing) lithium in an electrochemical manner, the contact conditions between the active material particle and the fibrous carbon are maintained more stably compared to the prior art so as to maintain the contacts between the active material particle and the conductive agent in a good condition. As a result, the active material particle isolated in an electrochemical manner does not increase so as to be able to exhibit cycle life characteristics, which can be satisfactory in practical use.

The fibrous carbon preferably has a lattice spacing $d_{002}$ of (002) plane in a range of 0.335 to 0.370 nm, which is determined by the X-ray diffraction measurement. This is because the fibrous carbon of which the $d_{002}$ is less than 0.335 nm is difficult to manufacture and in the case that it exceeds 0.370 nm, the electron conductivity is lowered. As for the length of the fibrous carbon, 1 to 20 $\mu$m is preferable. In the case that the length of the fibrous carbon is less than 1 $\mu$m, the electric contacts between the active material particles become worse. In the case that it exceeds 20 $\mu$m, the fibers of the fibrous carbon get entangled in each other so as to coagulate. In addition, the diameter of the fibrous carbon is preferably 0.1 to 0.5 $\mu$m. This is because, in the case the diameter of the fibrous carbon is less than 0.1 $\mu$m, the production becomes difficult and in the case the diameter of the fibrous carbon exceeds 0.5 $\mu$m, the contact part with the active material particle becomes smaller. The above described form gives a good dispersion, which makes it hard to coagulate.

The content of the fibrous carbon in the carbonaceous material is preferably 1 to 20 wt % of the above described composite particle forming the negative electrode. In the case of less than 1 wt %, the effect of the present invention hardly appear since the volume of the fibrous carbon is too small and in the case of more than 20 wt %, the charging and discharging capacity per volume becomes too small.

The active material particle constituting the negative electrode material in accordance with the present invention contains Sn of a high capacity as the component, and therefore, can contribute to an enhancement of the charging and discharging capacity. And at the same time, the expansion and the contraction as the entire particle can be prevented since the lithium ion non-storing phase exists in the particle. Furthermore, the conductive material which coats a part of or the entire surface of the active material particle contribute to the improvement of the charging and discharging cycle characteristics by storing and relieving the expansion and the contraction of the active material particle at the time of charging and discharging. The following advantages can be obtained by coating a part of or the entire surface of the active material particle with the conductive material.

Electron transfer between the negative electrode active material and the current collector at the time of absorption and desorption of lithium can be usually carried out by mixing the conductive agent. Only the mixing of the conductive agent, however, cannot give a sufficient contact area because the contact between the negative electrode active material and the conductive agent are in the form of the contact between particles. Therefore, in accordance with the present invention, a good electron conductance network can be formed even in the case that the electron conductivity of the active material particle is low by coating an exposed part, i.e. the surface, of the active material particle with a material of high electron conductivity through covering the surfaces of the active material particle with an electronically conductive material instead of merely mixing the negative electrode active material and the conductive agent. And even in the case that the particle has become minute through the repetition of charging and discharging, it is possible to reduce the influence upon the charging and discharging cycle characteristics since a better electron conductance network is formed by coating with an electronically conductive material than that obtained by a mere mixture in accordance with a prior art.

As for the ratio of the coated surface of the active material particle to the entire surface of the active material particle, 50% or more is preferable. It is possible to confirm this coating ratio by the electron probe microanalysis (EPMA) or the like. In the case that the coating ratio is 50% or more, the contact part of the conductive material part fixed on the surface exists between the neighboring particles, and therefore, the effect of relieving the expansion becomes easy to appear.

An example of a production method for the negative electrode material used in the present invention is described in the followings. First, a production method for active material particle before being coated with the conductive material is described. The above described active material particle is made of a solid solution or an intermetallic compound. Such an active material can be obtained by mixing the component elements in a predetermined ratio to give a mixture, melting the mixture at a high temperature to obtain a melt and quenching and solidifying the melt by means of a dry spraying method, a roll quenching method or an electrode rotating method. At this time, the particle size is adjusted by grounding, classification or the like, if necessary. And a preferable structure or texture of the solid solution or the intermetallic compound can be obtained through a heat treatment at a temperature lower than a solid phase curve temperature at the component element ratio of the particle in the metal state diagram, if necessary.

The above described method gives an active material particle comprising a lithium ion storing phase and a lithium ion non-storing phase by quenching and solidifying the melt. Through the afterward heat treatment, the uniformity of each of the phases, the lithium ion storing phase and the lithium ion non-storing phase, can be enhanced. Even in the case that the heat treatment is not carried out, such active material particle can be obtained. In addition, the method of quenching and solidification is not limited to the above described methods.

As the production method of obtaining the active material particle, such a method as follows also exists:

The active material particle can be obtained by adhering a layer comprising a component element of a lithium ion non-storing phase on the surface of the powder consisting of a lithium ion storing phase with the usage of a metal plating method or the like and by heating the powder at a temperature lower than the solid phase curve temperature of the lithium ion storing phase in the metal state diagram. As for another method, it can be carried out by a mechanical alloying method or the like. In the mechanical alloying method, the active material particle having the two phases can be obtained without conducting a heat treatment. The adhering method is not also limited to the above described method.

Next, a method for coating the conductive material on the surface of the active material particle obtained through the above described method is described.

First, in the case that a polymer material is used as the conductive material, the active material particle is immersed in, for example, an organic solvent in which a conductive polymer is dissolved. Then, the organic solvent is vaporized by a drying and heating treatment so that the particle surface is coated only with the conductive polymer. As for another coating method of the conductive material, there is a method of using a mechanochemical reaction where the conductive material is rolled out and coated on the active material surface by applying.mechanical energy mainly comprising compression force and grinding force between the active material and the conductive material through the usage of a compression grinding type pulverizer. As for the concrete form of the method, a hybridization method, a mechanofusion method, a theta composer method, a mechanomill method, a ball mill method or the like exist. In the case that this mechanochemical reaction is used, it becomes possible to make the bonding between the active material and the conductive material extremely firm because the conductive material is coated on the active material surface to which the mechanical energy comprising compression force and grinding force is applied so as to create an extremely high energy state temporarily through the friction heat or the like.

As for another coating method, a heat decomposed organic substance coating method through a CVD method or a coating layer forming method onto the active material surface by utilizing a plasma method may be employed. In addition, as for another method for coating the conductive material on the active material particle surface, a method of using a binding agent, a method of carrying out a surface absorption by utilizing a friction electrification caused by mutual contacts of the powder particles dispersed in the gas phase or the like may be used.

An active phases of the active material particle in accordance with the present invention contains Sn with high capacity as the component element, which contributes to the enhancement of the charging and discharging capacity. Though an inactive phase does not contribute to the charging and discharging, it contributes to a relief of the expansion and contraction of the active phase and a prevention of the active phase from coagulating, and moreover, the conductive material fixed or secured on the particle surface contributes to a relief of the expansion and contraction of the active material particle including the inactive phase as well as a prevention of the conductive network among the particles from being cut off.

A negative electrode for non-aqueous electrolyte rechargeable batteries in accordance with the present invention can be manufactured by applying a mixture layer comprising the above-mentioned composite particle, a conductive agent, a binding agent and the like onto the surface of a current collector. In addition, a non-aqueous electrolyte rechargeable battery can be manufactured by combining the negative electrode with a positive electrode for non-aqueous electrolyte rechargeable batteries, which is manufactured by applying a mixture layer comprising a conductive agent, a binding agent and the like onto a surface of a current collector in the same manner and, further, a non-aqueous electrolyte comprising a solvent and a lithium salt dissolved in the solvent.

The positive electrode used for a non-aqueous electrolyte rechargeable battery in accordance with the present invention can be manufactured by applying a mixture layer comprising a positive electrode material, which can store and desorb a lithium ion in an electrochemical and reversible manner, a conductive agent, a binding agent and the like onto a surface of a current collector. As for the positive electrode material used for the present invention, a compound containing or not containing lithium can be used. In particular, as a transitional metal oxide containing lithium, for example, $Li_x CoO_2$, $Li_x NiO_2$, $Li_x MnO_2$, $Lin_x Co_y Ni_{1-y}O_2$, $Li_x Co_y M_{1-y}O_z$, $Li_x Ni_{1-y}M_yO_z$, $Li_x Mn_2O_4$, $Li_x Mn_{2-y}M_y O_4$ (M is at least one of Na, Mg, Sc, Y, Mn, Fe, Co, Ni, Cu, Zn, Al, Cr, Pb, Sb and B, x=0 to 1.2, y=0 to 0.9, z=2.0 to 2.3) can be cited. The value of x in the above is a value before starting charging or discharging, which increases or decreases after the charging or discharging. It is also possible to use other positive electrode materials such as a transitional metal chalcogenide, vanadium oxide and the lithium compound thereof, niobium oxide and the lithium compound thereof, a conjugate polymer using an organic conductive material, sulfur type organic compound such as organic sulfide, a Chevrel phase compound, activated carbon and activated carbon fiber. In addition, it is also possible to use a mixture of a plurality of different positive electrode materials. Though the mean particle size of the positive electrode active material particle is not particularly limited, it is preferable to be 1 to 30 $\mu$m.

The conductive agent used for the above described electrodes for non-aqueous electrolyte rechargeable batteries may be any electron conductive materials, which are not fixed on the surfaces of the active material. particle used in the present invention but are utilized in the form of being mixed in the negative electrode and the positive electrode materials. As for the electron conductive material, for example, graphite groups such as natural graphite (scaly graphite and the like), artificial graphite and expaned graphite, carbon blacks such as acetylene black, ketjen black, channel black, furnace black, lamp black and thermal black, conductive fibers such as carbon fiber and metal fiber. They can be used alone or in combination of one or more. And in the case of the negative electrode, metal powders of copper, nickel and the like and organic conductive materials such as polyphenylene derivatives may be used. In the case of the positive electrode, carbon fluoride, a metal powder of aluminum or the like, a conductive whisker of zinc oxide, potassium titanate or the like, a conductive metal oxide such as titanium oxide or an organic conductive material such as a polyphenylene derivative may be used so as not to cause a chemical change at the changing and discharging potential of the positive electrode material to be used. Among those conductive agents, artificial graphite and acetylene black are particularly preferable. It is also possible to make the composite particle of the negative electrode material in accordance with the present invention has electron conductivity and a battery can be obtained without adding a conductive agent.

As the binding agent used in the above described electrodes for non-aqueous electrolyte rechargeable batteries, either of a thermoplastic resin or a thermosetting resin may be used. As the preferable binding agent, which can be used in the present invention, there are exemplified, polyethylene, polypropylene, polytetrafluoroethylene, polyvinylidene fluoride, styrene butadiene rubber, tetrafluoroethylene-hexafluoroethylene copolymer, tetrafluoroethylene-hexafluoropropylene copolymer, tetrafluoroethylene-perfluoroalkylvinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinyl ether-tetrafluoroethylene copolymer ethylene-acrylic acid copolymer or ion ($Na^+$) cross-linked polymer thereof, ethylene-methacrylic acid copolymer or ion ($Na^+$) cross-linked polymer thereof, ethylene-methyl acrylate copolymer or ion ($Na^+$) cross-linked polymer thereof, ethylene-methyl methacrylate copolymer or ion ($Na^+$) cross-linked polymer thereof. Those materials can be used alone or in combination of one or more.

As for the current collector of the above described negative electrode for non-aqueous electrolyte rechargeable batteries, any electron conductor, which does not cause a chemical change in a constructed battery may be used. For example, in addition to stainless steel, nickel, copper, titanium, carbon, conductive resin or the like as the material, the materials which are treated or processed with carbon, nickel or titanium on the surface of copper or stainless steel may be used. In particular, copper or copper alloy are preferable. The surfaces of those materials may be oxidized to be used. The surface of the current collector may become uneven through the surface processing. As for a form, in addition to a foil, a film, a sheet, a net, a punched sheet, a lath, a porous sheet, a foam, a sheet formed by molding fibers or the like may be used. Though the thickness is not particularly limited, 1 to 500 μm is used.

As for the current collector of the above described positive electrode for non-aqueous electrolyte rechargeable batteries, any electron conductor, which does not cause a chemical change at the electric potential of the charging and discharging of the used positive material may be used. For example, as a material, in addition to stainless steel, aluminum, titanium, carbon, conductive resin or the like, materials obtained by processing with carbon or titanium on the surface of aluminum or stainless steel may be used. In particular, aluminum or aluminum alloy are preferable. The surfaces of those materials may be oxidized and, then, used. The surface of the current collector may become uneven through the surface processing. As for the form, in addition to a foil, a film, a sheet, a net, a punched sheet, a lath, a porous sheet, a foam, a sheet formed by molding fibers, non woven cloth or the like may be used. Though the thickness is not particularly limited, 1 to 500 μm is used.

As for the electrode mixture of the above described electrodes for non-aqueous electrolyte rechargeable batteries, in addition to a conductive agent and a binding agent, a variety of additives such as a filler, a dispersion agent, an ion conductor, a pressure enforcement agent and the like can be used. Any fibrous materials, which do not cause a chemical change in the constructed battery, can be used as fillers. Usually, olefin polymer such as polypropylene or polyethylene or a fiber such as glass fiber or carbon fiber may be used. Though the additive amount of the filler is not particularly limited, 0 to 30 wt % of the electrode mixture is preferable. As for the structure of the negative electrode plate and the positive electrode plate in the present invention, it is preferable that the surface of the mixture layer of the negative electrode opposes to or faces the surface of the mixture layer of the positive electrode.

The non-aqueous electrolyte for the above described non-aqueous electrolyte rechargeable battery is formed of a solvent and a lithium salt dissolved in the solvent. As for the non-aqueous solvent, no protonic organic solvents such as aprotonic organic solvents can be exemplified. In concrete, for example, cyclic carbonates such as ethylene carbonate, propylene carbonate, butylene carbonate and vinylene carbonate, chain carbonates such as dimethyl carbonate, diethyl carbonate, ethyl-methyl carbonate and dipropyl carbonate, aliphatic carboxylic acid esters such as methyl formate, methyl acetate, methyl propionate and ethyl propionate, γ-lactones such as γ-butyrolactone, chain ethers such as 1,2-dimethoxy ethane, 1,2-diethoxy ethane and ethoxy-methoxy ethane, cyclic ethers such as tetrahydrofuran and 2-methyl tetrahydrofuran, dimethyl sulfoxide, 1,3-dioxolane, formamide, acetoamide, dimethyl formamide, dioxolane, acetonitrile, propylnitrile, nitromethane, ethylmonogrime, phosphoric acid triester, trimethoxy methane, dioxolane derivatives, sulfolane, methylsulfolane, 1,3-dimethyl-2-imidazolidinone, 3-methyl-2-oxazolidinone, propylene carbonate derivatives, tetrahydofuran derivatives, ethyl ether, 1,3-propanesalton anisole, dimethylsulfoxide, N-methylpyrolidone can be exemplified. They can be used alone or in a combination of one or more. Particularly, a mixture of a cyclic carbonate and a chain carbonate or a mixture of cyclic carbonate, a chain carbonate and an aliphatic carboxylic acid ester are preferable.

As for the lithium salt dissolved in those solvents, for example, $LiClO_4$, $LiAlCl_4$, $LiBF_4$, $LiPF_6$, $LiSbF_6$, $LiAsF_6$, LiSCN, LiCl, $LiCF_3SO_3$, $LiCH_3SO_3$, $LiCF_3CO_2$, $Li(CF_3SO_2)_3$, $LiN(CF_3SO_2)_2$, $LiC_4F_9SO_3$, $LiB(C_6H_5)$, $LiB_{10}Cl_{10}$, lithium lower aliphatic carboxylate, LiCl, LiBr, LiI, chloroboranlithium, lithium tetraphenyl borate and imidos can be exemplified and they can be used in the employed electrolyte alone or in a combination of two or more, and in particular it is preferable to use $LiPF_6$.

The amount of the electrolyte added in the battery is not particularly limited and a necessary amount can be used based on the amount of the positive electrode material, the negative electrode material, the size of the battery and the like. Though the dissolved amount of the support. electrolyte in the non-aqueous solvent is not particularly limited, 0.2 to 2 mol/l is preferable. It is particularly more preferable to be in a range of 0.5 to 1.5 mol/l.

As the electrolyte, a solid electrolyte as follows can be used. The solid electrolyte can be categorized to the inorganic solid electrolyte and the organic solid electrolyte. As for the inorganic solid electrolyte, lithium nitride, halogenide, oxyacid salt and the like are well known. Particularly, $Li_4SiO_4$, $Li_4SiO_4$—LiI—LiOH, $xLi_3PO_4$—(1−x)$Li_4SiO_4$, $Li_2SiS_3$, $Li_3PO_4$—$Li_2S$—$SiS_2$, phosphorous sulfide compound and the like are effective. As for the organic solid electrolyte, polymer materials such as polyethylene oxide, polypropylene oxide, polyphosphazen, polyaziridine, polyethylene sulfide, polyvinylalcohol, polyvinylidene fluoride, polyhexafluoropropylene and their derivatives, mixtures or composites are effective.

It is also possible to constitute a battery where an organic electrolyte formed of a solvent and a lithium salt dissolved in the solvent is absorbed and held in a polymer material and the polymer is contained in the positive electrode mixture and the negative electrode mixture, and a porous separator comprising a polymer storing and holding the organic electrolyte is integrated with the positive and negative electrodes. As for this polymer material, any materials which can absorb and hold the organic electrolyte may be used and, in particular, the copolymer of vinylidene fluoride and hexafluoropropylene is preferable.

Furthermore, on the purpose of improving the discharging capacity and the charging and discharging characteristics, it is effective to add other compounds to the electrolyte. For example, trimethylphosphite, triethanolamine, cyclic ether, ethylenediamine, n-grime, pyridine, hexaphosphate triamide, a nitrobenzene derivative, a crown ether, the fourth ammonium salt, ethylene glycol-dialkyl ether or the like can be exemplified.

As for the separator used in the present invention, an insulating micro-porous film which has a large ion permeability and a predetermined mechanical strength is used. It is also preferable to have a function to close a pore at a certain temperature or higher so as to increase the resistance. A sheet, non woven fabric or woven fabric comprising one or more of olefin polymers such as polypropylene and polyethylene, a glass fiber or the like may be used so as to have the resistance property against organic solvent and hydrophobic property. The pore diameter of the separator is preferably in the range where the positive and negative electrode materials, the binding agent and the conductive agent, which have desorbed from the electrode sheets, do not permeate, and it is desirable to be, for example, in a range of 0.01 to 1 $\mu$m. As for the thickness of the separator, 10 to 300 $\mu$m is generally used. And the vacancy ratio, in other words ratio of hole area, is determined in accordance with the permeability of an electron and an ion, materials, an osmotic pressure and the like, and generally 30 to 80%. is preferable.

Any forms of the batteries are applicable such as a coin type, a button type, a sheet type, a stacked type, a cylinder type, a flat type, a rectangular type, a large type used for electric vehicles or the like. A non-aqueous electrolyte rechargeable battery in accordance with the present invention can be used for a portable information terminal, a portable electronic appliances, a home use compact power storage device, a motor bike, an electric vehicle, a hybrid electric vehicle or the like and is not particularly limited thereto.

The present invention is described in further detail in accordance with the following examples. The present invention is not limited to those examples, though.

EXAMPLE 1

Table 2 shows the ratio of the lithium ion storing phase and the lithium ion non-storing phase as well as the formulated element ratio when producing of the negative electrode material (materials A to C) used in the present example. The powder or blocks of respective elements, which constituted the negative electrode material, prepared in accordance with a predetermined element ratio were introduced into a dissolving vessel to be melted. The obtained melt was quenched and solidified by the roll quenching method to obtain a solidified article. This solidified article was ground in a ball mill and the materials A to C comprising particles of 45 $\mu$m or less were obtained through classification with a sieve. It was confirmed that each of those active materials had the lithium ion storing phase and the lithium ion non-storing phase as shown in Table 2 by observing the cross section with an electron microscope.

TABLE 2

| Negative electrode material | Li storing phase | Li non storing phase | Ratio(Atomic %) |
|---|---|---|---|
| A | $Mg_2Sn$ | Mg | Sn:Mg = 25:75 |
| B | $CoSn_2$ | Co | Sn:Co = 40:60 |
| C | $NiSn_2$ | Ni | Sn:Ni = 40:60 |

As for the elements forming the active material particles used in the present example, Mg was used as a group 2 element and Co and Ni were used as transitional elements together with Sn element. When other elements in each of the groups including group 12 elements, the group 13 elements and the group 14 elements were used, similar effect could be obtained. The formulate ratio of the component elements when producing the active material particle is not particularly limited and, in other words, the formulate composition when the production is not particularly limited only if the active material particle to be obtained has two or more phases in which one of them is a phase containing Sn as its main component and another of them is a lithium ion non-storing phase. In addition, the lithium ion storing phase not only contains the intermetallic compound of Sn as shown in Table 2 but may contains an element other than Sn, such as O, C, N, S, Ca, Mg, Al, Fe, W, V, Ti, Cu, Cr, Co, P or the like in a microscopic amount. The lithium ion non-storing phase does not only contain simple substances as shown in Table 2 but also may contains an elements, which forms each of the solid solutions or intermetallic compounds or other element such as O, C, N, S, Ca, Mg, Al, Fe, W, V, Ti, Cu, Cr, Co, P or the like in a microscopic amount.

Next, the coating of the conductive material onto the surface of the active material particle is explained.

In the case that a polymer is used for the conductive material, a method for immersing materials A to C into a solution of the conductive polymer in an organic solvent employed. Each of materials A to C was immersed into a N-methyl-2-pyrolidone solution of polyaniline (available from NITTO DENKO CORPORATION) and dried by heating to fix polyaniline on the surface of each of the materials A to C.

In the case that other conductive materials were used, a mechanofusion method is used, which is a method of using a compression grinding type pulverizer. As for the amounts of starting materials, for example, 180 g of each of the materials A to C and 20 g of the conductive material were used. The rotation speed of the pulverizer was set to 1,800 rpm with the processing time of 20 minutes. Because of the centrifugal force generated by the high speed rotation, the conductive material was pressed onto the surface of the active material. And at this time, compression force and grinding force were generated so that the conductive material can be rolled out and coated onto the negative electrode active material. Through the above described method, the surface of the active material particle was coated with each of the conductive materials, natural graphite (NG-7 available from The Kansai Coke and Chemicals Co., Ltd.), artificial graphite (KS6 available from TIMCAL KABUSHIKI KAISYA), acetylene black (available from DENKI KAGAKU KOGYO KABUSHIKI KAISYA), ketjen black (available from LION CORPORATION), nickel superfine powder (available from SHINKU YAKIN KABUSHIKI KAISYA), cobalt powder (available from SHINKU YAKIN KABUSHIKI KAISYA), copper powder (available from KOJUNDO KAGAKU KABUSHIKI KAISYA) are used. Also, fibrous carbon having a $d_{002}$ of approximately 0.340 nm, a length of approximately 10 μm and a diameter of approximately 0.259 μm, was used by mixing with artificial graphite in a weight ratio of 1 to 1. Then, it was confirmed by SEM that the conductive material was fixed on the surface of the active material particle in the obtained composite particle.

Figure 1:
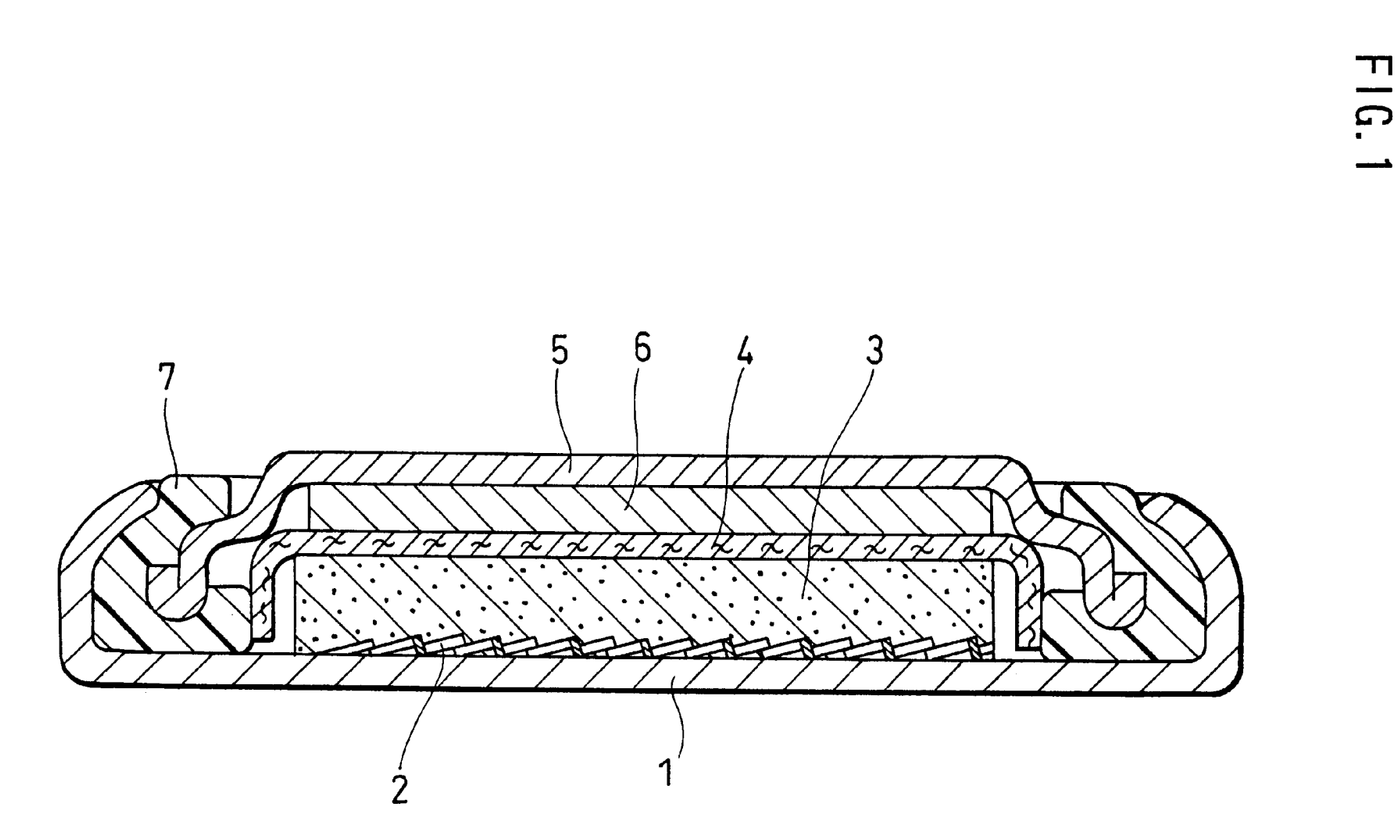
FIG. 1 is a cross section view of a test cell for evaluating a negative electrode used in an example of the present invention.

Next, a method of evaluating the function of the negative electrode material, the composite particle is explained. FIG. 1 shows a coin type test cell of the 2320 size (diameter of 2.3 mm, total height of 2.0 mm). The electrochemical characteristics such as the charging and discharging capacity of the negative electrode material was measured using this test cell.

In FIG. 1, a case made of stainless steel plate is represented by numeral 1. A current collector 2 comprising an expanded metal made of stainless steel is welded to the inner bottom of the case 1, and a test electrode 3 made of the negative electrode material is formed integrally on this current collector. A separator 4 made of a micro-porous polypropylene film is provided on the test electrode 3. A metal lithium electrode 6 is pressed and adhered onto the inner surface of the cover 5 made of stainless steel plate. After an organic electrolyte was poured into the case 1 and the cover 5, they are combined via a gasket 7 made of polypropylene therebetween so as to assemble a test cell by cramping and tightly closing(sealing) the opening end of the case.

In the present example, the test electrode 3 was formed by using composite particles manufactured by coating the materials A to C in Table 2 with the conductive material through the above described mechanofusion method. That is to say, a mixture obtained by mixing the above described composite particle with a predetermined amounts of artificial graphite as a conductive agent and polyvinylidene fluoride as a bonding agent, was formed integrally on the current collector 2. The test cell was assembled after fully drying the test electrode 3 formed within the case 1 under a reduced pressure at 80° C. And as comparative examples, test electrodes were formed from mixture obtained by mixing the materials A to C in Table 2 with predetermined amounts of the above described artificial graphite and polyvinylidene fluoride. The mixture ratio of the negative electrode mixture, in the example, was prepared so that the weight ratio of the active material, the conductive material coated on the surface, the conductive agent and the bounding agent becomes 85:5:5:5 and, in the comparative. examples, the weight ratio of the active material, the conductive agent and the binding agent becomes 85:10:5.

As for the organic electrolyte, a solution dissolving 1 mol/l of hexafluorolithium phosphate as a solute in a mixed solvent of ethylene carbonate and diethylene carbonate in equal volumes was used. As for the charging and discharging of the test cell, a constant current of 0.5 mA/cm² of the current density was used for both charging and discharging and, after the charging was carried out until it become 0 V, the discharging was carried out until it become 3 V. Under this condition 300 cycles of the charging and discharging ware repeated in a thermostat of which the temperature was maintained at 20° C. And, a ratio of the discharging capacity at the 300th cycle to the initial discharging capacity was calculated out as the capacity maintenance ratio. Here, the charging and discharging was in accordance with the charging and discharging reaction of a battery in practical use. That is to say, it was assumed that the lithium ion storing reaction in the negative electrode was recognized as charging and the lithium releasing reaction was recognized as discharging. The result of this is shown in Table 3.

TABLE 3

| Negative electrode material | Conductive material | (Ex.) Capacity maintenance ratio (%) | (Com. Ex.) Capacity maintenance ratio (%) |
|---|---|---|---|
| A | Polyaniline | 87 | 61 |
|   | Natural graphite | 82 |   |
|   | Artificial graphite | 86 |   |
|   | Acetylene black | 83 |   |
|   | Ketjen black | 80 |   |
|   | Fibrous carbon + Artificial graphite | 89 |   |
|   | Nickel | 75 |   |
|   | Cobalt | 73 |   |
|   | Copper | 76 |   |
| B | Polyaniline | 84 | 60 |
|   | Natural graphite | 79 |   |
|   | Artificial graphite | 85 |   |
|   | Acetylene black | 82 |   |
|   | Ketjen black | 78 |   |
|   | Fibrous carbon + Artificial graphite | 86 |   |
|   | Nickel | 72 |   |
|   | Cobalt | 72 |   |
|   | Copper | 74 |   |
| C | Polyaniline | 86 | 64 |
|   | Natural graphite | 84 |   |
|   | Artificial graphite | 87 |   |
|   | Acetylene black | 84 |   |
|   | Ketjen black | 82 |   |
|   | Fibrous carbon + Artificial graphite | 88 |   |
|   | Nickel | 76 |   |
|   | Cobalt | 76 |   |
|   | Copper | 77 |   |

As is seen from Table 3, when the negative electrode active material particle surface is coated with the conductive material and the negative electrode to which artificial graphite is mixed as a conductive agent is used, the capacity maintenance ratio is high and the cycle characteristics exhibits excellency compared to the case when only the artificial graphite is mixed without a coating of the conductive material. It is understood that the improved cycle characteristics is well exhibited through the facts that the expansion and contraction of the active material, which have been slightly mitigated because of the structure comprising the lithium ion storing and non storing phases, are further suppressed by the coating of the conductive material and that the transfer of an electron becomes smoother by the increase of the contact area.

EXAMPLE 2

Using the material A, the negative electrode comprising composite particles, of which the coating ratios of artificial graphite were different, were manufactured and the capacity maintenance ratios were examined. The negative electrode mixture was prepared so that the weight ratio of the material A coated with artificial graphite, the conductive agent and the binding agent become 90:5:5. The weight ratio of the material A and artificial graphite was varied in accordance with the coating ratio so that the material A coated with artificial graphite occupied 90 wt % of the entire mixture. The result is shown in FIG. 2.

Figure 2:
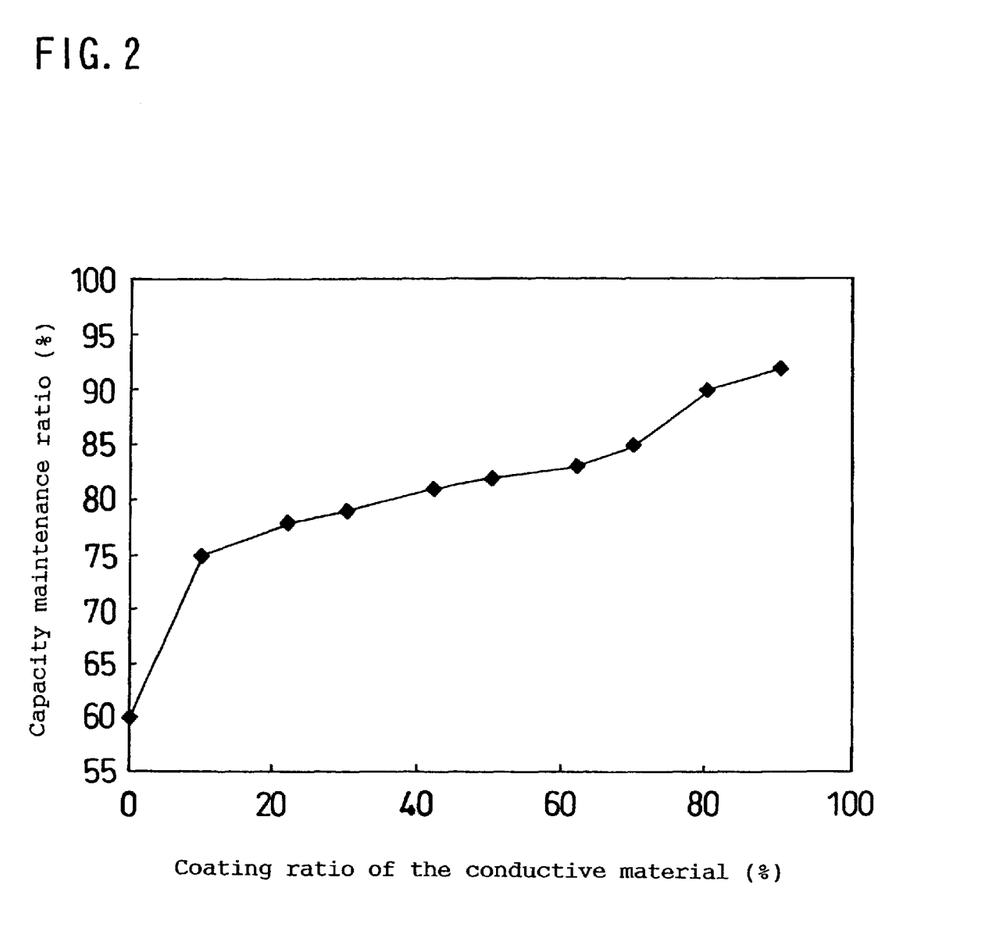
FIG. 2 is a graph showing the relations between the coating ratio of the electronically conductive material to the surface of the negative electrode active material particle and the capacity maintenance ratio in an example of the present invention.

It is clear from FIG. 2 that the cycle characteristics is improved by coating 10% or more of the entire surface of the material A with artificial graphite, which is an electronically conductive material. Thereby, it is considered that, in the case that the coating ratio is less than 10%, the contact or continuity of the conductive material particles adhered and fixed on the surface of the negative electrode active material is not satisfactory and appropriate electron conductive networks cannot be obtained, which becomes the factor of reducing the charging and discharging efficiency. In the case that other active materials and other conductive materials are used, similar results can be observed.

EXAMPLE 3

In the present example, it was examined how the change of the value of $d_{002}$ of the fibrous carbon influenced the discharging capacity and the cycle life characteristics. The negative electrode mixture, which was used in the present example, contained 85 wt % of the negative electrode active material particles, 5 wt % of the fibrous carbon, which coated the particles, 5 wt % of artificial graphite to be mixed and 5 wt % of polyvinylidene fluoride as a binding agent. As for fibrous carbon employed therein, the length was approximately 10 μm and the diameter was approximately 0.25 μm.

TABLE 4

| Negative electrode material | $d_{002}$(Å) | Discharging capacity(mAh/cm³) | | Capacity maintenance ratio (%) |
|---|---|---|---|---|
| | | Initial cycle | 300th cycle | |
| A | 3.35 | 860 | 807 | 94 |
| | 3.5 | 851 | 802 | 94 |
| | 3.7 | 844 | 784 | 93 |
| | 3.9 | 426 | 169 | 40 |

As is seen from Table 4, when the value of $d_{002}$ exceeds 3.70 Å, the electron conductivity of the fibrous carbon declines so that enough electron conductivity cannot be provided among the active material particles, and therefore, particles isolated from the electron conductance network appear, where the initial discharging capacity becomes little and the cycle life becomes quite poor even if the length and the diameter of the fibrous carbon are varied. Therefore, it is found to be preferable to use fibrous carbon having a value of $d_{002}$ of 3.35 to 3.70 Å.

EXAMPLE 4

It was examined how the length and the diameter of the fibrous carbon influenced the discharging capacity and the cycle life characteristics. The value of $d_{002}$ of the fibrous carbon used herein was approximately 3.40 Å. The result is shown in Table 5.

TABLE 5

| Negative electrode material | Diameter (μm) | length (μm) | Discharging capacity (mAh/cm³) | | Capacity maintenance ratio (%) |
|---|---|---|---|---|---|
| | | | Initial cycle | 300th cycle | |
| B | 0.1 | 0.1 | 412 | 169 | 41 |
| | 0.5 | | 405 | 162 | 40 |
| | 1 | | 392 | 153 | 39 |
| | 0.1 | 1 | 862 | 808 | 94 |
| | 0.5 | | 859 | 806 | 94 |
| | 1 | | 483 | 390 | 81 |
| | 0.1 | 20 | 852 | 799 | 94 |
| | 0.5 | | 850 | 792 | 93 |

TABLE 5-continued

| Negative electrode material | Diameter (μm) | length (μm) | Discharging capacity (mAh/cm³) | | Capacity maintenance ratio (%) |
|---|---|---|---|---|---|
| | | | Initial cycle | 300th cycle | |
| | 1 | | 464 | 376 | 81 |
| | 0.1 | 30 | 379 | 151 | 40 |
| | 0.5 | | 374 | 135 | 36 |
| | 1 | | 363 | 113 | 31 |

As is seen from Table 5, in the case that the length of the fibrous carbon is less that 1 μm, which is short, the discharging capacity of the initial cycle becomes small and the cycle life becomes poor. It is considered that this is because electric contacts among the active material particles are not satisfactory so that the electron conductance network, which is supposed to contribute to the electrochemical reaction of all particles, cannot be made and active material particles, which cannot relate to the electrochemical reaction, are appeared. And in the case that the length of the fibrous carbon exceeds 20 μm, the discharging capacity of the initial cycle again becomes small and the cycle life also becomes poor. It is considered that this is because the fibrous carbon entangles to coagulate and the dispersion properties of the fibrous carbon for the active material particles are not satisfactory so that the contact points between the active material particles and the fibrous carbon become fewer, which generates the active material particles that cannot relate to the electrochemical reaction. And in the case that the diameter of the fibrous carbon exceeds 0.5 μm, the initial discharging capacity and the cycle life both become somewhat smaller. It is considered that this is because, in spite of the fact that the ratio of the fibrous carbon in a form of fine threads decreases so that the surface in the diameter direction becomes more prone to contact the active material particles than the surface in the longitudinal direction, the surface including the diameter direction lacks the flexibility, of which the condition is close to that of a plane. And, therefore, the effect of increasing the contact points in accordance with the present invention can hardly emerge.

EXAMPLE 5

It was examined how the ratio of the fibrous carbon in the carbonaceous material containing the fibrous carbon influenced the discharging capacity and the cycle life characteristics. As for the fibrous carbon employed herein, the value of $d_{002}$ was approximately 0.340 nm, the length was approximately 10 μm, and the diameter was approximately 0.25 μm. The negative electrode mixture contained 45 parts by weight of the negative electrode active material particles, 50 parts by weight of the carbonaceous material including the fibrous carbon and 5 parts by weight of polyvinylidene fluoride as a binding agent. And a part of the carbonaceous material of 50 parts by weight was utilized as the conductive material for forming the composite particle by coating the active material particle. The relations between the content of the fibrous carbon in the composite particle and the discharging capacity as well as the capacity maintenance ratio are shown in Table 6.

TABLE 6

| Negative electrode material | Percentage of Fibrous fiber (%) | Discharging capacity (mAh/cm³) | | Capacity maintenance ratio (%) |
|---|---|---|---|---|
| | | Initial cycle | 300 cycle | |
| C | 0.1 | 670 | 587 | 88 |
| | 1 | 667 | 614 | 92 |
| | 10 | 627 | 594 | 95 |
| | 20 | 572 | 549 | 96 |
| | 50 | 483 | 433 | 90 |

As is seen from Table 6, in the range where the ratio of the fibrous carbon in the carbonaceous material is 1 to 20 wt % for the composite particle of the negative electrode material, every cycle life for the active material particle of the material C exhibit 92% or more, which indicates satisfactory cycle life characteristics. This seems to indicate that, in the case where the ratio of the fibrous carbon is less than 1 wt % for the composite particle of the negative electrode material, the effect of the present invention, which employs the increase of the contact points due to the fibrous carbon and the large recovery force thereof, can hardly emerge, and in the case of 50 wt % or more, the decrease of the charging and discharging capacity is occurring and so is the coagulation of the fibrous carbon.

Here, though in the above described examples, the tests are carried out by using coin type batteries, similar results are obtained from the tests using cylinder type batteries or stack type batteries utilizing polymer electrolytes.

As described above, in accordance with the present invention, even when the active material particle repeat the expansion and contraction along with the occlusions and discharges of lithium in an electrochemical manner, the contacts between the active material particle and the conductive agent are maintained so as to improve the charging and discharging cycle life characteristics. As a result, a non-aqueous electrolyte rechargeable battery can be provided of which the capacity is higher and of which the cycle characteristics as well as the charging and discharging characteristics are more improved than conventional non-aqueous electrolyte rechargeable batteries with carbon materials being used as negative electrode materials.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A negative electrode for non-aqueous electrolyte rechargeable batteries comprising:

an active material composed of a lithium ion storing phase, which contains at least Sn and a lithium ion non-storing phase, and an electronically conductive material, which coats 10% or more of the surface of said active material, wherein said electronically conductive material is a carbonaceous material comprising fibrous carbon having a fiber shape having a lattice spacing $d_{002}$ of the (002) plane of 3.35 to 3.70 Å, a length of 1 to 20 μm and a diameter of 0.1 to 0.5 μm, and said fibrous carbon in the carbonaceous material is in the range of 1 to 20 wt % of said active material and said electronically conductive material.

2. The negative electrode for non-aqueous electrolyte rechargeable batteries in accordance with claim 1, wherein said lithium ion storing phase further contains, as another component, at least one element selected from the group consisting of the group 2, elements, the transitional elements, the group 12 elements, the group 13 elements and the group 14 elements in the periodic table, and said another component and Sn form a solid solution or an intermetallic compound.

3. A non-aqueous electrolyte rechargeable battery, comprising a positive electrode capable of a reversible electrochemical reaction of a lithium ion, a non-aqueous electrolyte comprising a lithium salt dissolved in an organic solvent and a negative electrode in accordance with claim 1.

* * * * *